US012585328B2

(12) United States Patent
Eguchi

(10) Patent No.: US 12,585,328 B2
(45) Date of Patent: Mar. 24, 2026

(54) ELECTRONIC APPARATUS

(71) Applicant: CANON KABUSHIKI KAISHA, Tokyo (JP)

(72) Inventor: Kouhei Eguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 287 days.

(21) Appl. No.: 18/359,580

(22) Filed: Jul. 26, 2023

(65) Prior Publication Data

US 2024/0045498 A1 Feb. 8, 2024

(30) Foreign Application Priority Data

Aug. 8, 2022 (JP) ................................. 2022-126021

(51) Int. Cl.
| | |
|---|---|
| *G06F 3/01* | (2006.01) |
| *G02B 27/00* | (2006.01) |
| *G02B 27/01* | (2006.01) |
| *G06T 7/50* | (2017.01) |

(52) U.S. Cl.
CPC ......... *G06F 3/013* (2013.01); *G02B 27/0093* (2013.01); *G02B 27/0179* (2013.01); *G06T 7/50* (2017.01); *G02B 2027/0187* (2013.01); *G06T 2207/10016* (2013.01); *G06T 2207/10028* (2013.01)

(58) Field of Classification Search
CPC ..... G06F 3/013; G06F 3/011; G02B 27/0093; G02B 27/0179; G02B 2027/0187; G02B 2027/0138; G06T 7/50; G06T 2207/10016; G06T 2207/10028; G06T 7/73
See application file for complete search history.

(56) References Cited

U.S. PATENT DOCUMENTS

2019/0018236 A1 * 1/2019 Perreault ............ G02B 27/0172
2022/0197377 A1 * 6/2022 Kim ........................ G06V 40/18

FOREIGN PATENT DOCUMENTS

JP 2012-113450 A 6/2012
JP 2012-196279 A 10/2012

* cited by examiner

*Primary Examiner* — Jianxun Yang
(74) *Attorney, Agent, or Firm* — Cowan, Liebowitz & Latman, P.C.

(57) ABSTRACT

An electronic apparatus according to the present invention acquires right line-of-sight information on a line-of-sight of a right eye of a user, and a left line-of-sight information on a line-of-sight of a left eye of the user, determines a first distance, which is a distance from the user to an intersection of the line-of-sight of the right eye and the line-of-sight of the left eye, and a second distance, which is a distance from the user to an object existing between the user and the intersection, on a basis of the right line-of-sight information and the left line-of-sight information; and controls setting of predetermined processing based on the right line-of-sight information and the left line-of-sight information, on a basis of a difference between the first distance and the second distance.

16 Claims, 9 Drawing Sheets

EYEBALL CENTER

X AXIS DIRECTION

Z AXIS DIRECTION

Y AXIS DIRECTION

*FIG. 5*

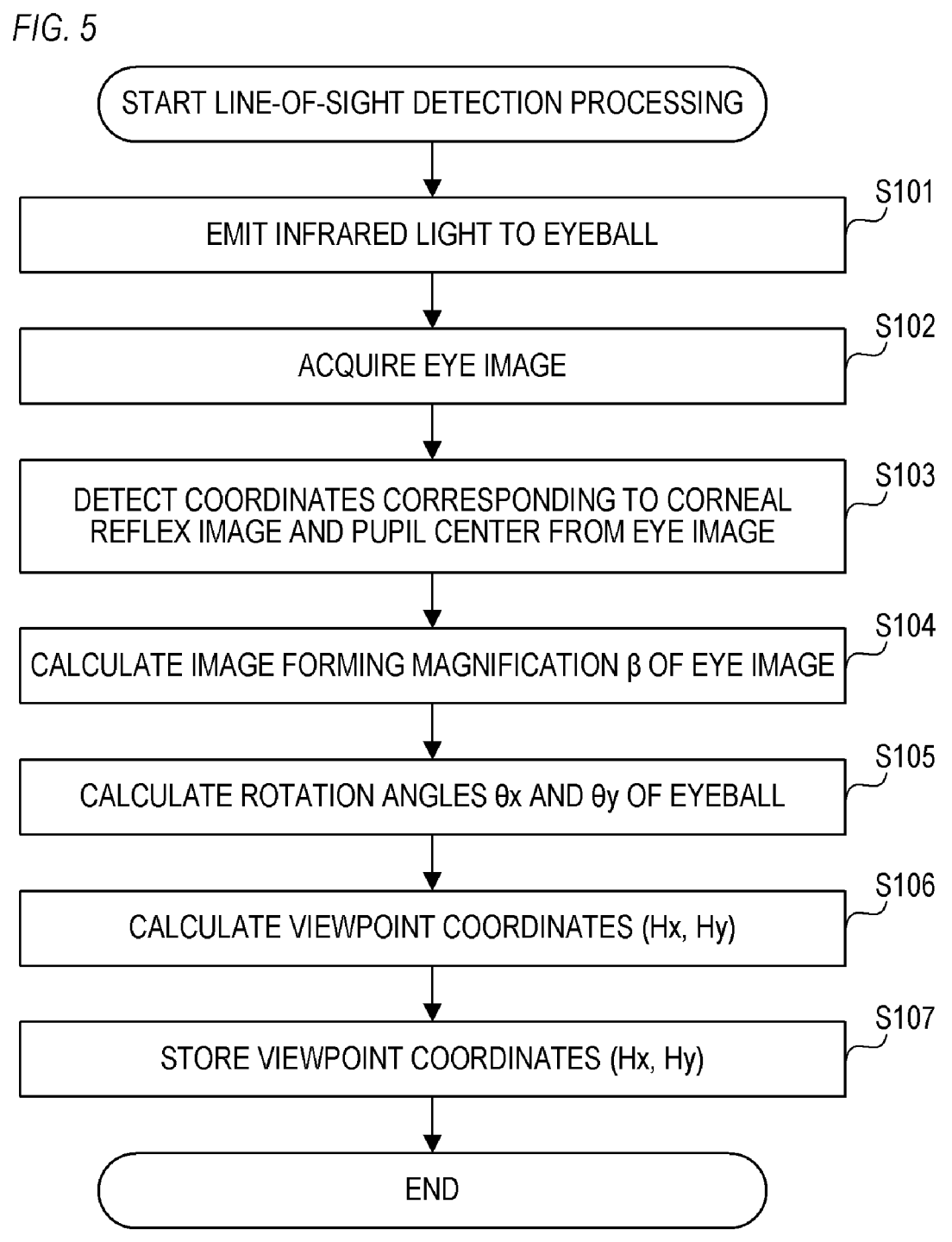

```
┌─────────────────────────────────────────────────┐
│     START LINE-OF-SIGHT DETECTION PROCESSING     │
└─────────────────────────────────────────────────┘
                        │
                        ▼
┌─────────────────────────────────────────────────┐  S101
│           EMIT INFRARED LIGHT TO EYEBALL          │
└─────────────────────────────────────────────────┘
                        │
                        ▼
┌─────────────────────────────────────────────────┐  S102
│                 ACQUIRE EYE IMAGE                 │
└─────────────────────────────────────────────────┘
                        │
                        ▼
┌─────────────────────────────────────────────────┐  S103
│   DETECT COORDINATES CORRESPONDING TO CORNEAL     │
│   REFLEX IMAGE AND PUPIL CENTER FROM EYE IMAGE    │
└─────────────────────────────────────────────────┘
                        │
                        ▼
┌─────────────────────────────────────────────────┐  S104
│  CALCULATE IMAGE FORMING MAGNIFICATION β OF EYE IMAGE │
└─────────────────────────────────────────────────┘
                        │
                        ▼
┌─────────────────────────────────────────────────┐  S105
│   CALCULATE ROTATION ANGLES θx AND θy OF EYEBALL  │
└─────────────────────────────────────────────────┘
                        │
                        ▼
┌─────────────────────────────────────────────────┐  S106
│       CALCULATE VIEWPOINT COORDINATES (Hx, Hy)    │
└─────────────────────────────────────────────────┘
                        │
                        ▼
┌─────────────────────────────────────────────────┐  S107
│        STORE VIEWPOINT COORDINATES (Hx, Hy)       │
└─────────────────────────────────────────────────┘
                        │
                        ▼
┌─────────────────────────────────────────────────┐
│                       END                         │
└─────────────────────────────────────────────────┘
```

ESTIMATED VIEWPOINT A

LEFT EYE　　　　　　　　　　RIGHT EYE

DEGREE OF GAZE

TH3

L2 = LONG

L2 = SHORT

TH2　TH1　　　　　　　　DEGREE OF DIVERGENCE

FIG. 11

ELECTRONIC APPARATUS

BACKGROUND OF THE INVENTION

Field of the Invention

The present invention relates to an electronic apparatus that can acquire line-of-sight information of a user.

Description of the Related Art

In recent years, the automation and intelligence of head mounted type display devices having a line-of-sight detection function, such as a spectacle type device utilizing mixed reality (MR) or augmented reality (AR), are progressing. Japanese Patent Application Publication No. 2012-196279 discloses a technique to determine whether a user (viewer) is intentionally viewing a certain portion (whether the viewer is gazing at a certain portion) based on a time-dependent change of a pupil diameter of the user. Further, Japanese Patent Application Publication No. 2012-113450 discloses a technique to determine an alertness of a user (driver) based on a convergence angle of the user.

However, even if the techniques disclosed in Japanese Patent Application Publication No. 2012-196279 and Japanese Patent Application Publication No. 2012-113450 are used, in some cases it is difficult to determine accurately whether or not the user is gazing at the object, and to appropriately perform predetermined processing based on the line-of-sight information. For example, in the case of the technique disclosed in Japanese Patent Application Publication No. 2012-196279, whether or not the pupil is constricted is determined, but the pupil diameter changes depending on the quantity of light that enters the eye of the user, hence it is difficult to determine accurately whether or not the user is gazing. In the case of Japanese Patent Application Publication No. 2012-113450, the convergence angle of the user is used, but it is difficult to determine accurately whether or not the user is gazing by the convergence angle alone.

SUMMARY OF THE INVENTION

The present invention provides a technique to perform predetermined processing based on the line-of-sight information appropriately.

The present invention in its first aspect provides an electronic apparatus including at least one memory and at least one processor which function as: an acquisition unit configured to acquire right line-of-sight information on a line-of-sight of a right eye of a user, and left line-of-sight information on a line-of-sight of a left eye of the user; a determination unit configured to determine a first distance, which is a distance from the user to an intersection of the line-of-sight of the right eye and the line-of-sight of the left eye, and a second distance, which is a distance from the user to an object existing between the user and the intersection, on a basis of the right line-of-sight information and the left line-of-sight information; and a control unit configured to control setting of predetermined processing based on the right line-of-sight information and the left line-of-sight information, on a basis of a difference between the first distance and the second distance.

The present invention in its second aspect provides an electronic apparatus including at least one memory and at least one processor which function as: a first acquisition unit configured to acquire first information on a position in a depth direction of a field-of-view of a user, the first information being based on first line-of-sight information on a line-of-sight of a right eye of the user and second line-of-sight information on a line-of-sight of a left eye of the user; a second acquisition unit configured to acquire second information on a position in the depth direction of a target which is set based on at least one of the first line-of-sight information and the second line-of-sight information; and a control unit configured to control predetermined processing based on at least one of the first line-of-sight information and the second line-of-sight information, on a basis of the first information and the second information.

The present invention in its third aspect provides a control method of an electronic apparatus, including: acquiring right line-of-sight information on a line-of-sight of a right eye of a user, and left line-of-sight information on a line-of-sight of a left eye of the user; determining a first distance, which is a distance from the user to an intersection of the line-of-sight of the right eye and the line-of-sight of the left eye, and a second distance, which is a distance from the user to an object existing between the user and the intersection, on a basis of the right line-of-sight information and the left line-of-sight information; and controlling setting of predetermined processing based on the right line-of-sight information and the left line-of-sight information, on a basis of a difference between the first distance and the second distance.

Further features of the present invention will become apparent from the following description of exemplary embodiments with reference to the attached drawings.

BRIEF DESCRIPTION OF THE DRAWINGS

FIG. 5 is a flow chart of the line-of-sight detection operation;

FIG. 11 is a diagram depicting a positional relationship of a user, a viewpoint, and an object.

DESCRIPTION OF THE EMBODIMENTS

Embodiment 1

Embodiment 1 of the present invention will be described. In Embodiment 1, an example of applying the present invention to an optical see-through type display device will be described, but the present invention is also applicable to a video see-through type display device, for example. The optical see-through type display device displays a graphic (e.g. virtual object) on a display surface (display surface which the light from a real space (outer world) transmits through), for example. In this case, the user can view the graphic displayed on the display surface. Further, the user can also view the real space (outer world) directly on the display surface. The video see-through type display device combines the image capturing the real space (virtual space) with the graphic when necessary, and displays the composite image on the display surface (display surface which light from the real space does not transmit through). In this case, the user can not view the real space directly, but can indirectly view the real space in the displayed image.

In Embodiment 1, an example of applying the present invention to a head mounted type display device will be described, but the present invention is also applicable to a handheld type display device and a stationary type display device, for example. The head mounted type display device is smart glasses (augmented reality (AR) glasses) or a head mounted display (HMD), for example. The handheld display device is a smartphone or a tablet terminal, for example. The display device which the user holds by hand and attaches (applied) to the head is a type of handheld display device, and also a type of head mounted type display device. The smartphone mounted to a head mounted adaptor (e.g. virtual reality (VR) goggles) is a type of head mounted type display device.

The present invention is also applicable to electronic apparatuses other than the display devices. The present invention is applicable to various electronic apparatuses that can acquire line-of-sight information of the user. For example, the present invention is applicable to a control device (e.g. controller or personal computer (PC)) connected to a display device. Example 1 is an example of applying the present invention to AR, but the present invention is also applicable to other cross realities (XRs), such as mixed reality (MR) and VR.

Description of Configuration

Figure 1A:
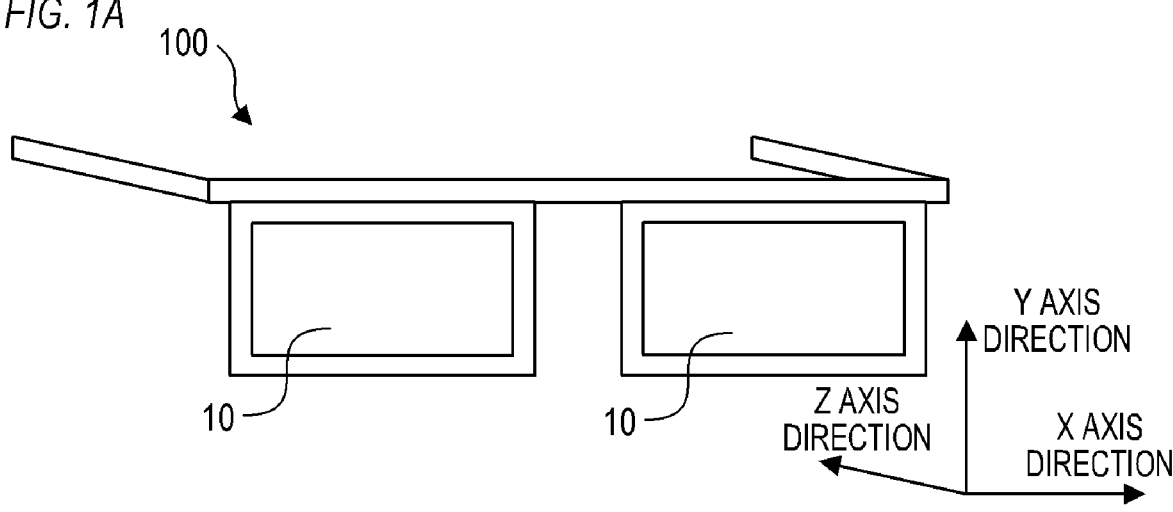
FIGS. 1A and 1B are external views of a display device.
Figure 1B:
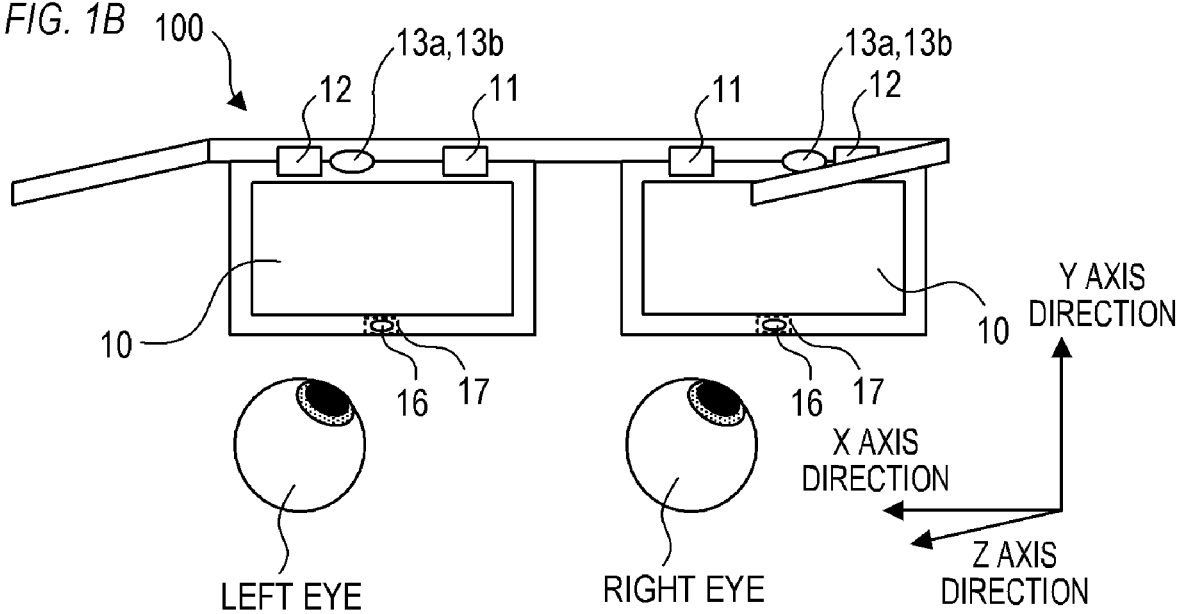

FIGS. 1A and 1B are external views of a display device 100 according to Embodiment 1. FIG. 1A is a front perspective view, and FIG. 1B is a rear perspective view. The display device 100 is optical see-through type AR glasses. The display device 100 can independently detect a line-of-sight of a right eye and a line-of-sight of a left eye of a user wearing the display device 100 on his/her head. Hereafter the user wearing the display device 100 on his/her head is simply referred to as a "user".

The lenses 10 are optical members that face the eyes of the user. The user can view the outer world through the lenses 10. Displays 11 display a virtual object (virtual image of a virtual object) for both eyes of the user (both left and right eyes) based on control (display control) from a CPU 2, which will be described later. The user can view the displayed virtual object as if the virtual object exists in the outer world. Light source drive circuits 12 drive the light sources 13a and 13b. Each of the light sources 13a and 13b is a light source to illuminate an eye of the user, and is an infrared light-emitting diode, for example, which emits an infrared light invisible to the user. A part of the lights emitted from the light sources 13a and 13b and reflected by the eyes of the user converges on eye image pickup elements 17 respectively by light-receiving lenses 16. These members are disposed for the right eye and the left eye respectively. For example, the eye image pickup elements 17 are the right image pickup element that images the right eye, and the left image pickup element that images the left eye.

Figure 2:
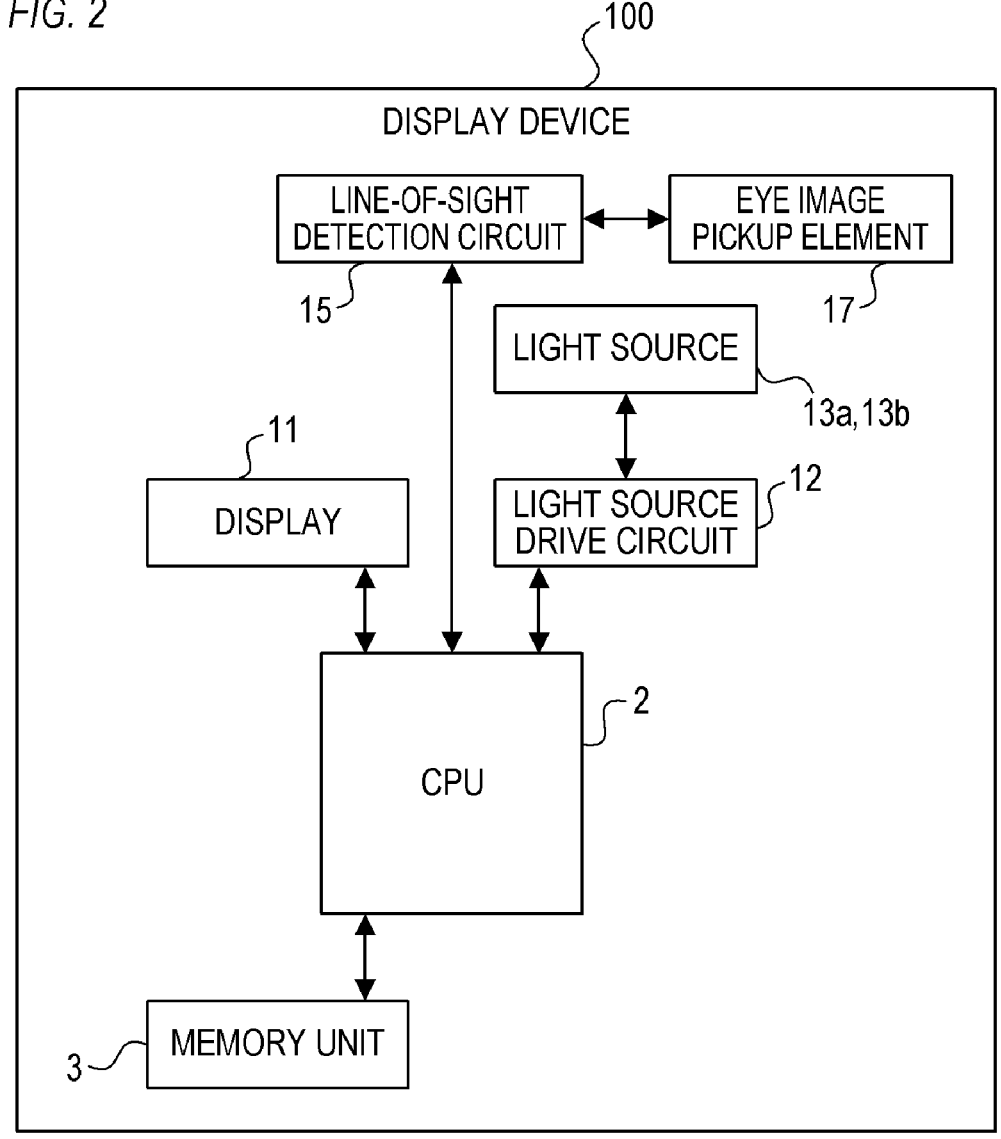
FIG. 2 is a block diagram of the display device.

FIG. 2 is a block diagram depicting an electric configuration of the display device 100. The CPU 2 is a central processing unit of a microcomputer embedded in the display device 100, and controls the display device 100 in general. The display 11, the light source drive circuit 12, a line-of-sight detection circuit 15 and a memory unit 3 are connected to the CPU 2.

The memory unit 3 has a storage function to store video signals from the eye image pickup element 17, and a storage function to store later mentioned line-of-sight correction parameters (parameters to correct an individual difference of the line-of-sight).

The line-of-sight detection circuit 15 A/D-converts the outputs from the eye image pickup elements 17 (eye images capturing the eye) in a state where an optical image of the eye is formed on the eye image pickup element 17, and sends the result to the CPU 2. The CPU 2 extracts the feature points required for the line-of-sight detection from the eye image in accordance with the later mentioned predetermined algorithm, and detects the line-of-sight of the user based on the positions of the feature points. For example, the CPU 2 acquires right line-of-sight information related to the line-of-sight of the right eye based on the right eye image acquired by the right image pickup element, and acquires left line-of-sight information related to the line-of-sight of the left eye based on the left eye image acquired by the left image pickup element.

Description on Line-of-Sight Detection Method

Figure 3:
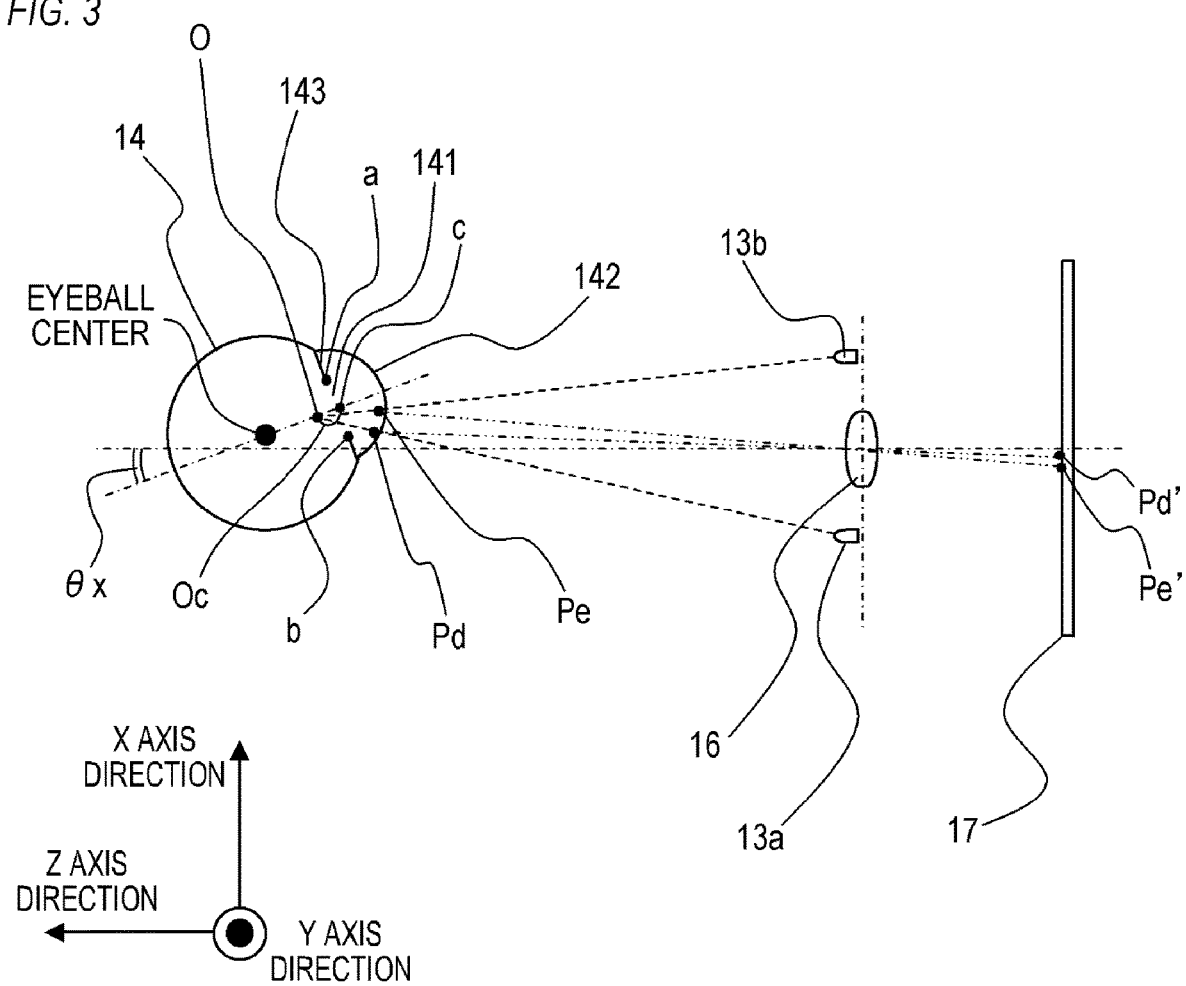
FIG. 3 is a diagram for describing a principle of a line-of-sight detection method.
Figure 4A:
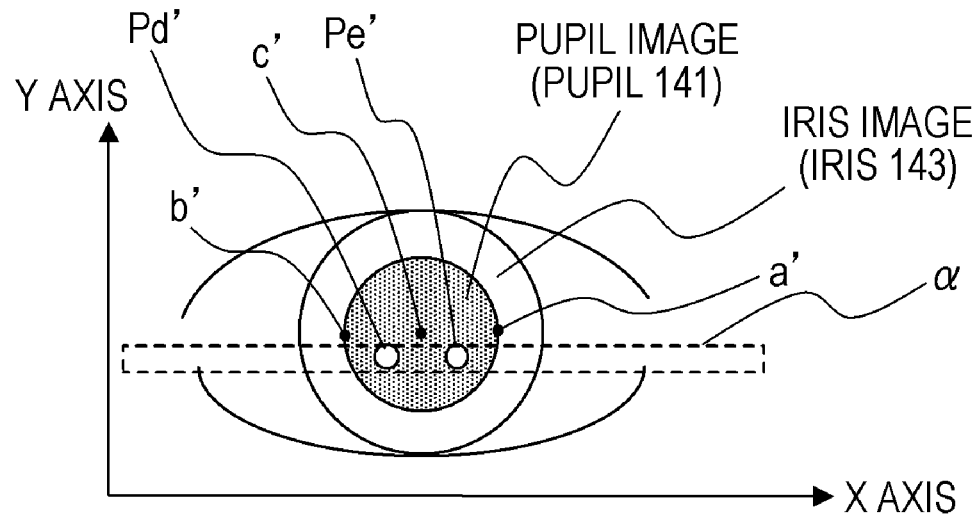
FIG. 4A is a diagram depicting an eye image.
Figure 4B:
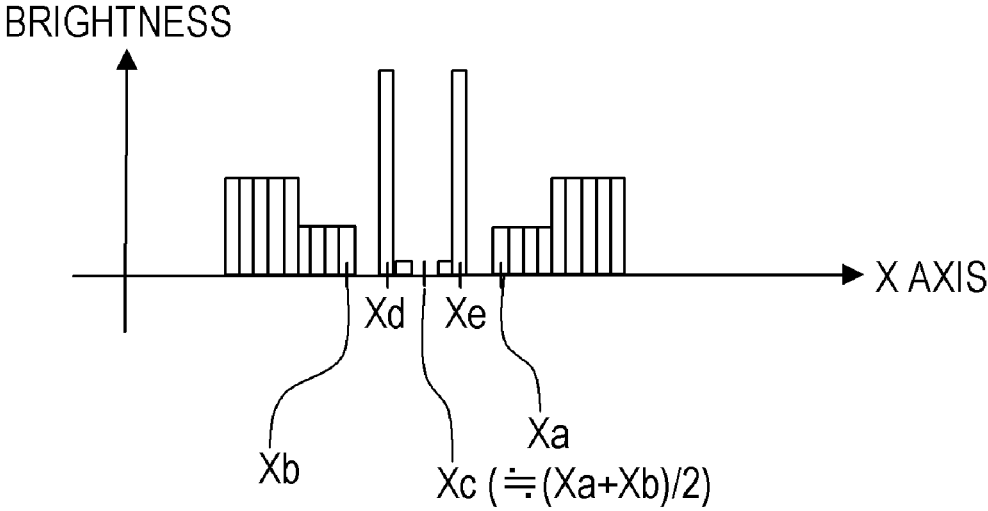
FIG. 4B is a diagram indicating a brightness distribution of the eye image.

The line-of-sight detection method will be described with reference to FIGS. 3, 4A, 4B and 5. The line-of-sight of the right eye and the line-of-sight of the left eye are both detected by the following line-of-sight detection method. FIG. 3 is a diagram for describing the principle of the line-of-sight detection method, and is a schematic diagram of an optical system to detect a line-of-sight. As illustrated in FIG. 3, the light sources 13a and 13b are disposed at approximately symmetric positions with respect to the optical axis of a light-receiving lens 16, and illuminate an eyeball 14 of the user. A part of the lights emitted from the light sources 13a and 13b and reflected by the eyeball 14 is collected to the eye image pickup element 17 by the light-receiving lens 16. FIG. 4A is a schematic diagram of an eye image captured by the eye image pickup element 17 (optical image of the eye projected to the eye image pickup element 17), and FIG. 4B is a diagram indicating the output intensity of the eye image pickup element 17. FIG. 5 is a flow chart of the line-of-sight detection processing.

When the line-of-sight detection processing in FIG. 5 starts, in step S101, the CPU 2 controls the light sources 13a and 13b using the light source drive circuit 12, so that the infrared light is emitted toward the eyeball 14 of the user. The optical image of the eye of the user illuminated by the infrared light forms an image on the eye image pickup element 17 via the light-receiving lens 16, and is photoelectrically-converted by the eye image pickup element 17. Thereby processable electric signals of the eye image can be acquired.

In step S102, the CPU 2 acquires an eye image (image data, image signals) from the eye image pickup element 17 via the line-of-sight detection circuit 15.

In step S103, the CPU 2 detects the coordinates of points corresponding to the corneal reflex images Pd and Pe of the light sources 13a and 13b and the pupil center c, from the eye image acquired in step S102.

The infrared lights emitted from the light sources 13a and 13b illuminate a cornea 142 of the eyeball 14 of the user. Here the corneal reflex images Pd and Pe formed by a part of the infrared lights reflected on the surface of the cornea 142 are collected by the light-receiving lens 16, form images on the eye image pickup element 17, and become cornea reflex images Pd' and Pe' in the eye image. In the same manner, the lights from the edges a and b of the pupil 141 also form images on the eye image pickup element 17, and become pupil edge images a' and b' in the eye image.

FIG. 4B indicates the brightness information (brightness distribution) of a region α in the eye image in FIG. 4A. In FIG. 4B, the brightness distribution in the X axis direction is indicated, where the X axis direction is the horizontal direction of the eye image, and the Y axis direction is the vertical direction thereof. In Embodiment 1, it is assumed that the coordinates of the corneal reflex images Pd' and Pe' in the X axis direction (horizontal direction) are Xd and Xe, and the coordinates of the pupil edge images a' and b' in the X axis direction are Xa and Xb. As indicated in FIG. 4B, at the coordinates Xd and Xe of the corneal reflex images Pd' and Pe', an extremely high level of brightness is acquired. In the region from the coordinate Xa to the coordinate Xb, which corresponds to a region of the pupil 141 (region of the pupil image acquired when the light from the pupil 141 forms an image on the eye image pickup element 17), an extremely low level of brightness is acquired, excluding the coordinates Xd and Xe. Then in a region of an iris 143 outside of the pupil 141 (region of an iris image outside the pupil image acquired when the light from the iris 143 forms an image), an intermediate level of brightness, between the above mentioned two types of brightness, is acquired. For example, in a region of which X coordinate (coordinate in the X axis direction) is larger than the coordinate Xa, and a region of which X coordinate is smaller than the coordinate Xb, the intermediate level of brightness, between the above mentioned two types of brightness, is acquired.

From the brightness distribution indicated in FIG. 4B, the X coordinates Xd and Xe of the corneal reflex images Pd' and Pe' and the X coordinates Xa and Xb of the pupil edge images a' and b' can be acquired. For example, coordinates at which the brightness is extremely high can be acquired as the coordinates of the corneal reflex images Pd' and Pe', and coordinates at which the brightness is extremely low can be acquired as the coordinates of the pupil edge images a' and b'. If a rotation angle θx of an optical axis of the eyeball 14, with respect to an optical axis of the light-receiving lens 16, is small, the coordinate Xc of the pupil center image c' (center of the pupil image), acquired when the light from the pupil center c forms an image on the eye image pickup element 17, can be given by Xc≈(Xa+Xb)/2. In other words, the coordinate Xc of the pupil center image c' can be calculated from the X coordinates Xa and Xb of the pupil edge images a' and b'. In this way, the coordinates of the corneal reflex images Pd' and Pe' and the coordinate of the pupil center image c' can be estimated.

In step S104, the CPU 2 calculates an image forming magnification of the eye image. The image forming magnification β is a magnification determined by the position of the eyeball 14 with respect to the light-receiving lens 16, and can be calculated using the function of the distance (Xd−Xe) of the corneal reflex images Pd' and Pe'.

In step S105, the CPU 2 calculates a rotation angle of the optical axis of the eyeball 14 with respect to the optical axis of the light-receiving lens 16. The X coordinate of the mid-point between the corneal reflex image Pd and the corneal reflex image Pe approximately matches with the X coordinate of a center of curvature O of the cornea 142. Hence if Oc is a standard distance from the center of curvature O of the cornea 142 to the center c of the pupil 141, the rotation angle θx of the eyeball 14 on the Z-X plane (plane vertical to the Y axis) can be calculated using the following Formula 1. The rotation angle θy of the eyeball 14 on the Z-Y plane (plane vertical to the X axis) also can be calculated using a method similar to the method for calculating the rotation angle θx.

$$\beta \times Oc \times \text{SIN } \theta x \approx \{(Xd+Xe)/2\} - Xc \qquad \text{(Formula 1)}$$

In step S106, the CPU 2 estimates a viewpoint of the user on the lens 10 using the rotation angles θx and θy calculated in step S105. If the coordinates of the viewpoint (Hx, Hy) are coordinates corresponding to the pupil center c, the coordinates of the viewpoint (Hx, Hy) can be calculated using the following Formulas 2 and 3. The viewpoint may be regarded as a position at which the line-of-sight is directed, or as a position where the user is looking, or as a line-of-sight position.

$$Hx=m \times (Ax \times \theta x+Bx) \qquad \text{(Formula 2)}$$

$$Hy=m \times (Ay \times \theta y+By) \qquad \text{(Formula 3)}$$

A parameter m in Formulas 2 and 3 is a constant that is determined by the configuration of an optical system to perform the line-of-sight detection processing, and is a conversion coefficient to convert the rotation angles θx and θy into the coordinates corresponding to the pupil center c on the lens 10. It is assumed that the parameter m has been determined and stored in the memory unit 3 in advance. The parameters Ax, Bx, Ay and By are line-of-sight correction parameters to correct the individual difference of the line-of-sight, and are acquired by calibrating the line-of-sight detection. The line-of-sight correction parameters Ax, Bx, Ay and By are stored in the memory unit 3 before starting the line-of-sight detection processing.

In step S107, the CPU 2 stores the coordinates of the viewpoint (Hx, Hy) in the memory unit 3, and ends the line-of-sight detection processing.

The line-of-sight detection method is not limited to the above mentioned method, but may be any method that can acquire the line-of-sight information (information on the line-of-sight) from the eye image. As the final line-of-sight information, information indicating the line-of-sight direction (direction of line-of-sight), instead of information indicating the viewpoint, may be acquired. For example, instead of acquiring the coordinates of the viewpoint (Hx, Hy), the processing up to acquiring the rotation angle (Ax×θx+Bx or Ay×θy+By) may be performed.

Figure 6:
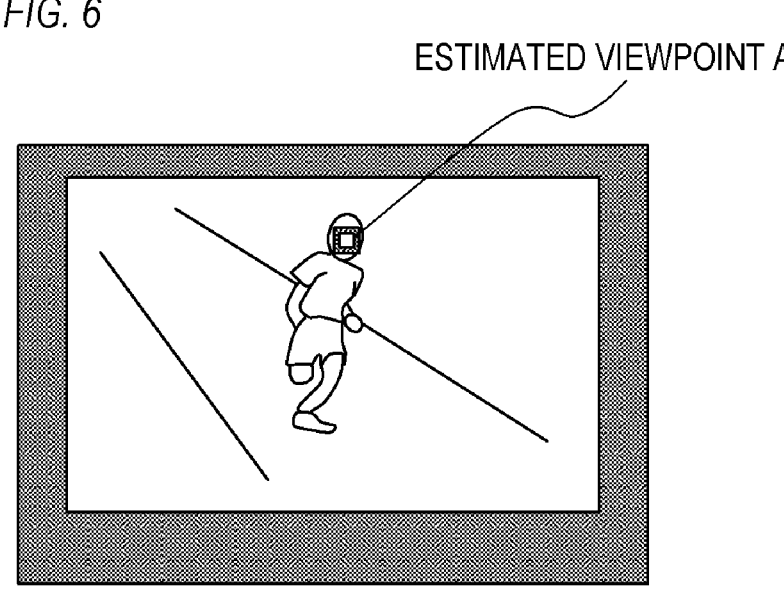
FIG. 6 is a diagram depicting a field-of-view.

FIG. 6 is a diagram indicating a field-of-view of the user (range where the user can view via the lens 10), and indicating a state where the display 11 is operating. As indicated in FIG. 6, the display 11 displays a frame or the like at a current viewpoint A (estimated position). The CPU 2 may control the display 11, so that the information on a real object which the user is consciously viewing is displayed as a user interface (UI) in accordance with the result of the line-of-sight detection (line-of-sight information). The real object is an object that actually exists in the outer world (real space). Viewing consciously may be regarded as "gazing".

Method for Determining Gaze

A viewpoint can be estimated by performing the line-of-sight detection processing. However, it cannot be estimated whether the user is consciously (intentionally) viewing the object. The user may or may not be viewing an object consciously. For example, a user may be overlooking the entire visual field, including the object. Even in such a way of viewing, a viewpoint is estimated by the line-of-sight detection processing. Since the viewpoint in the case of overlooking is not a viewpoint intended by the user, processing unexpected by the user may be performed as predetermined processing based on the viewpoint (predetermined processing based on the right line-of-sight information and the left line-of-sight information).

The predetermined processing based on the viewpoint is processing to display an item at the viewpoint, for example. The item is a frame (pointer) that is displayed at the viewpoint A in FIG. 6, for example. Using this pointer, the user may select a button displayed on the display 11, or select a real object, for example. In the case where a real object is selected, information on the selected real object is displayed on the display 11, for example.

In the case of overlooking, however, display of the pointer is not intended by the user, and interferes with visibility of the user. In some cases, a button or a real object may be selected in error, the opposite of the intension of the user.

The predetermined processing based on the viewpoint may be processing to create a heat map of the viewpoint (processing to collect information (e.g. viewpoint, time, age) to create a heat map). By creating the heat map, an advertisement can be displayed at an appropriate position (position where advertisement effect is high, such as position the user frequently looks at). The heat map may be created associating the viewpoint with time. Then an advertisement can be displayed at an appropriate position at each timing. The heat map may be created by collecting information on a plurality of users. In this case, the heat map may be created associating the viewpoint with age. Then an advertisement appropriate for each age group can be displayed at an appropriate position.

However, if the viewpoints in the case of overlooking are collected and used for creating a heat map, a desired heat map (heat map indicating distribution of the positions the user intentionally looked at) cannot be created, and an advertisement cannot be displayed at an appropriate position, for example.

Therefore in Embodiment 1, the CPU 2 determines a visual distance and an object distance based on right line-of-sight information (viewpoint of the right eye) and left line-of-sight information (viewpoint of the left eye). The visual distance is a distance from the user to an intersection between the line-of-sight of the right eye and the line-of-sight of the left eye (viewpoint with both eyes, a position viewed with both eyes). The object distance is a distance from the user to an object (a real object or a virtual object) which exists between the user and a viewpoint with both eyes. When the difference of the visual distance and the object distance is smaller than a threshold TH, the CPU 2 determines that the user is consciously viewing the object (the user is gazing at the object) and the degree of gaze is high. When the difference of the visual distance and the object distance is larger than the threshold TH, on the other hand, the CPU 2 determines that the user is overlooking the entire visual field including the object, and the degree of gaze is low. When the difference between the visual distance and the object distance is the same as the threshold TH, the CPU 2 may determine that either the degree of gaze is high or the degree of gaze is low.

Then depending on the determination result on whether the degree of gaze is high or low, the CPU 2 controls the setting of the predetermined processing based on the right line-of-sight information and the left line-of-sight information. For example, the CPU 2 sets the predetermined processing to enable if it is determined that the degree of gaze is high, and to disable if it is determined that the degree of gaze is low. Thereby the viewpoint in the case of overlooking is not used for the predetermined processing, and the above mentioned problem can be solved. For example, display of unnecessary items can be prevented, and a drop in reliability of the heat map can be prevented.

The CPU 2 may control the setting of the predetermined processing based on the right line-of-sight information and the left line-of-sight information, depending on the difference between the visual difference and the object distance, without determining whether the degree of gaze is high or low.

Method for Determining Visual Distance

Figure 7:
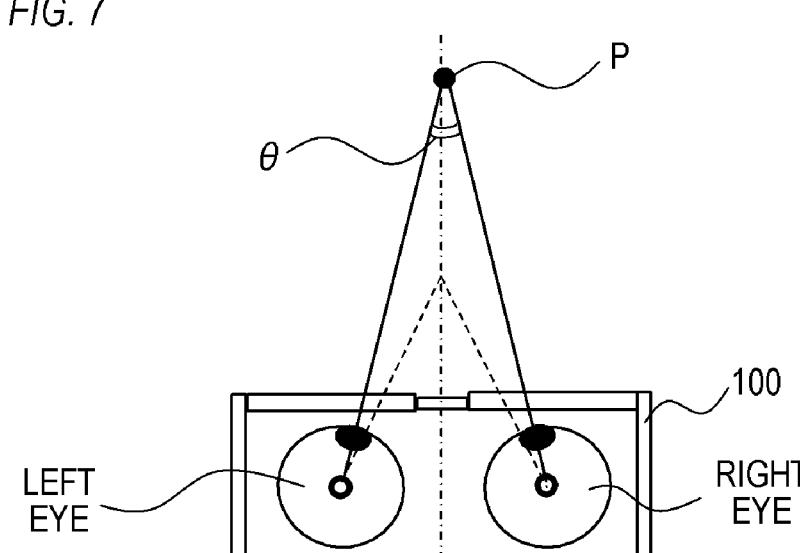
FIG. 7 is a diagram depicting a relationship between a viewpoint and a convergence angle.

The convergence angle formed by the line-of-sight of the right eye and the line-of-sight of the left eye is smaller as the visual distance is longer; and the convergence angle is larger as the visual distance is shorter. For example, as indicated in FIG. 7, the convergence angle $\theta$ is smaller as the viewpoint P with both eyes is more distant from the user, and the convergence angle $\theta$ is larger as the viewpoint P is closer to the user. Therefore in Embodiment 1, the CPU 2 determines the convergence angle based on the right line-of-sight information and the left line-of-sight information, and determines the visual distance in accordance with the convergence angle.

Method for Changing Setting of Line-of-Sight Processing

Figure 8:
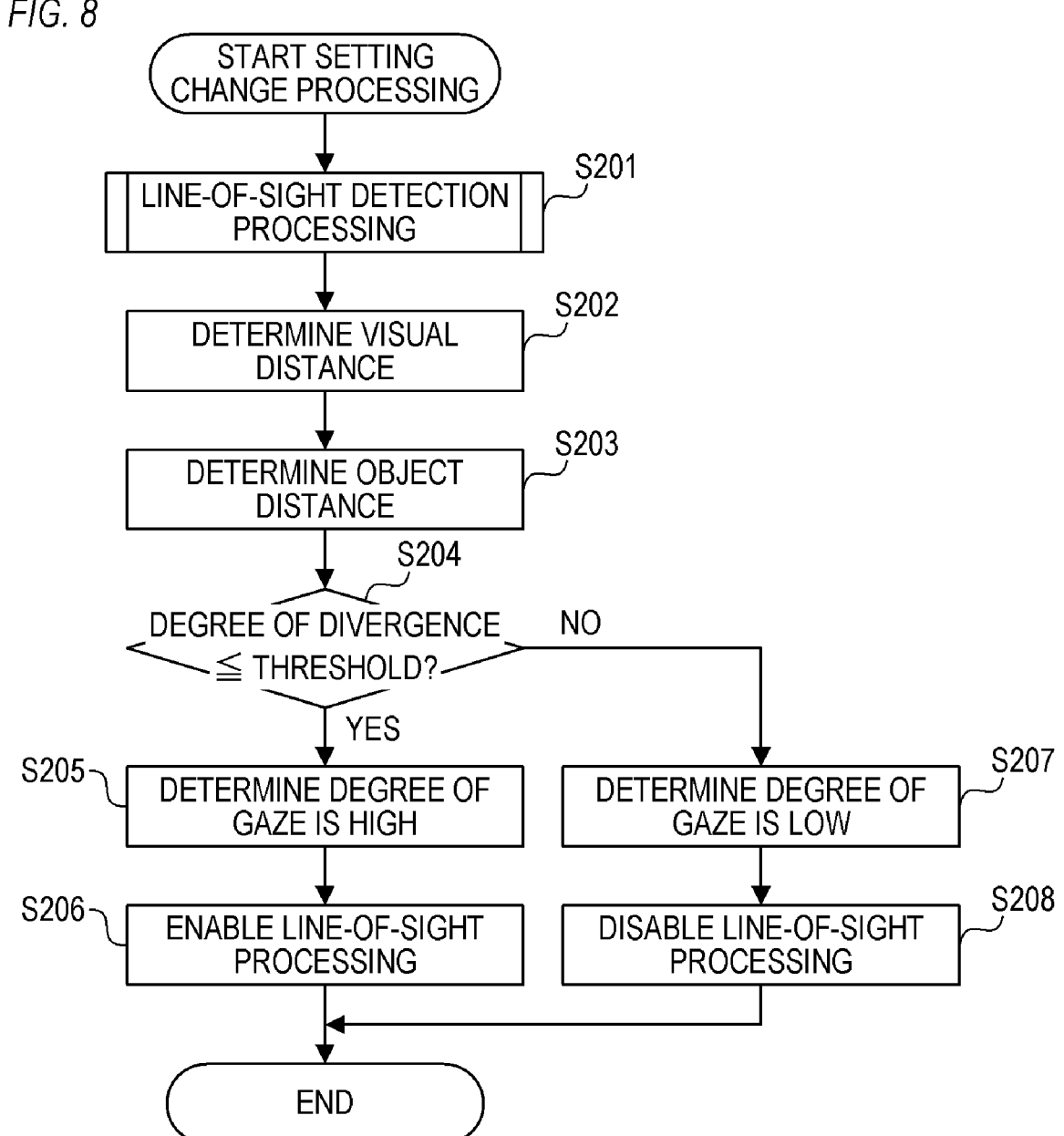
FIG. 8 is a flow chart of the setting change processing.
Figures 9, 10:
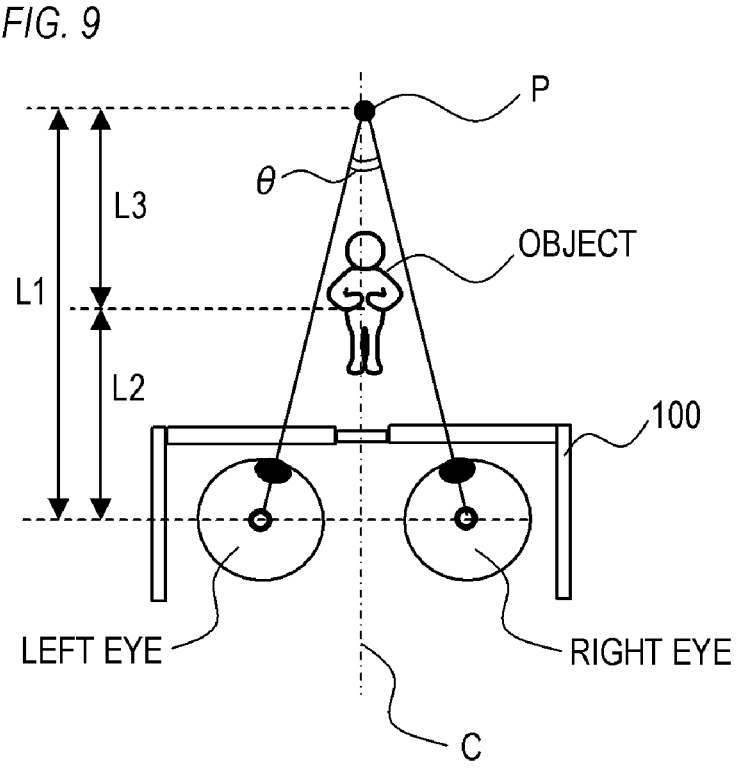
FIG. 9 is a diagram depicting a positional relationship of a user, a viewpoint, and an object.
FIG. 10 is a graph indicating a relationship between a degree of divergence and a degree of gaze.

A method for changing the setting of the line-of-sight processing (predetermined processing based on the right line-of-sight information and the left line-of-sight information) will be described with reference to FIGS. 8 to 10. FIG. 8 is a flow chart of the setting change processing (processing to change the setting of the line-of-sight processing). FIG. 9 is a diagram depicting a positional relationship of a user, a viewpoint with both eyes, and a position of an object. FIG. 10 is a graph indicating a relationship between a degree of divergence (difference of the visual distance and the object distance) and a degree of gaze. For example, when the display device 100 starts up, the setting change processing in FIG. 8 starts. The CPU 2 repeatedly performs the setting change processing in FIG. 8.

When the setting change processing in FIG. 8 starts, the CPU 2 performs the line-of-sight detection processing in FIG. 5 in step S201, and acquires the right line-of-sight information (viewpoint of right eye) and the left line-of-sight information (viewpoint of left eye).

In step S202, the CPU 2 determines (calculates) the convergence angle $\theta$ based on the right line-of-sight information and the left line-of-sight information acquired in step S201. The convergence angle $\theta$ is an angle formed by the line-of-sight of the right eye and the line-of-sight of the left eye, and can be calculated from the rotation angle of the right eye and the rotation angle of the left eye, for example. Then the CPU 2 determines (calculates) the visual distance L1 from the convergence angle $\theta$ and the distance between both eyes, using a trigonometric function. As indicated in FIG. 9, the visual distance L1 is a distance from the user to the viewpoint P with both eyes.

In step S203, the CPU 2 determines an object (real object or virtual object) that exists between the user and the viewpoint P. For example, as indicated in FIG. 9, the CPU 2 determines an object that exists in a direction from the center of the display device 100 to the viewpoint P (an object that exists on the center line C). Then the CPU 2 determines the distance from the user to the determined object as an object distance L2. The method for determining the object distance L2 is not especially limited. Here a case of determining the distance to the real object as the object distance L2 will be considered. In this case, for example, a camera (imaging apparatus) is disposed in the display device 100 in advance, in order to image the outer world. Then the object distance L2 is determined using the depth information acquired by the camera. The object distance L2 may be determined using the light detection and ranging (LiDAR)

method. Now a case of determining the distance to a virtual object as the object distance L2 will be considered. In this case, the object distance L2 is determined using a three-dimensional position that is set as a position of the virtual object.

In step S204, the CPU 2 calculates the difference of the visual distance L1 determined in step S202 and the object distance L2 determined in step S203 (that is, the degree of divergence L3=L1−L2), and determines whether the degree of divergence L3 is not more than a threshold TH. The CPU 2 advances the processing to step S205 if it is determined that the degree of divergence L3 is not more than the threshold TH, or to step S207 if it is determined that the degree of divergence L3 is more than the threshold TH.

In step S205, the CPU 2 determines that the degree of gaze is high. In step S206, the CPU 2 sets the line-of-sight processing to enable (line-of-sight processing is executed).

In step S207, the CPU 2 determines that the degree of gaze is low. In step S208, the CPU 2 sets the line-of-sight processing to disable (line-of-sight processing is stopped).

The threshold TH to be compared with the degree of divergence L3 may or may not be a predetermined fixed value. As the visual distance L1 increases, the convergence angle θ decreases, and the calculation error of the visual distance L1 increases. As the object distance L2 increases, the calculation error of the object distance L2 increases. In the case where the user is gazing at a nearby object, a small degree of divergence that is not more than 1 m is acquired, but in the case where the user is gazing at a distant object, a large degree of divergence that is about several meters is acquired. Therefore the CPU 2 may use the threshold TH, which is larger as the object distance L2 is longer. For example, as indicated in FIG. 10, the CPU 2 may use a threshold TH1 if the object distance L2 is long, and use a threshold TH2, which is smaller than the threshold TH1, if the object distance L2 is short.

The above is the example of comparing the degree of divergence L3 with the threshold TH, but the CPU 2 may determine a degree of gaze based on the degree of divergence L3, and compare the degree of gaze with a threshold. In this case, the CPU 2 determines that the degree of gaze is high if the degree of gaze is higher than the threshold, and determines that the degree of gaze is low if the degree of gaze is lower than the threshold. The method for determining the degree of gaze is not especially limited, but the correspondence between the degree of divergence L3 and the degree of gaze may be determined in advance, so that the degree of gaze is determined from the degree of divergence L3 in accordance with this correspondence. If the degree of divergence L3 is constant, the CPU 2 may determine a value that is higher as the object distance is longer, as the degree of gaze. For example, as indicated in FIG. 10, the correspondence in the case where the object distance L2 is long and the correspondence in the case where the object distance L2 is short may be determined in advance, as the correspondence of the degree of divergence L3 and the degree of gaze. In this case, processing similar to the case of the above mentioned thresholds TH1 and TH2 can be implemented using only one threshold TH3 that is compared with the degree of gaze.

According to the setting change processing in FIG. 8, when the state where the user is gazing at the object changes to a state where the user is directing his/her line-of-sight to the area beyond the object, setting of the line-of-sight processing is changed. It is also possible that the display device 100 may be mounted on a pseudo-person (e.g. a head model having pseudo-eyeballs made of glass or the like), and operation similar to the above mentioned operation may be reproduced. In this case, the direction of the line-of-sight of the pseudo-eyeballs is adjusted by adjusting the angle of the pseudo-eyeballs.

Figure 11:
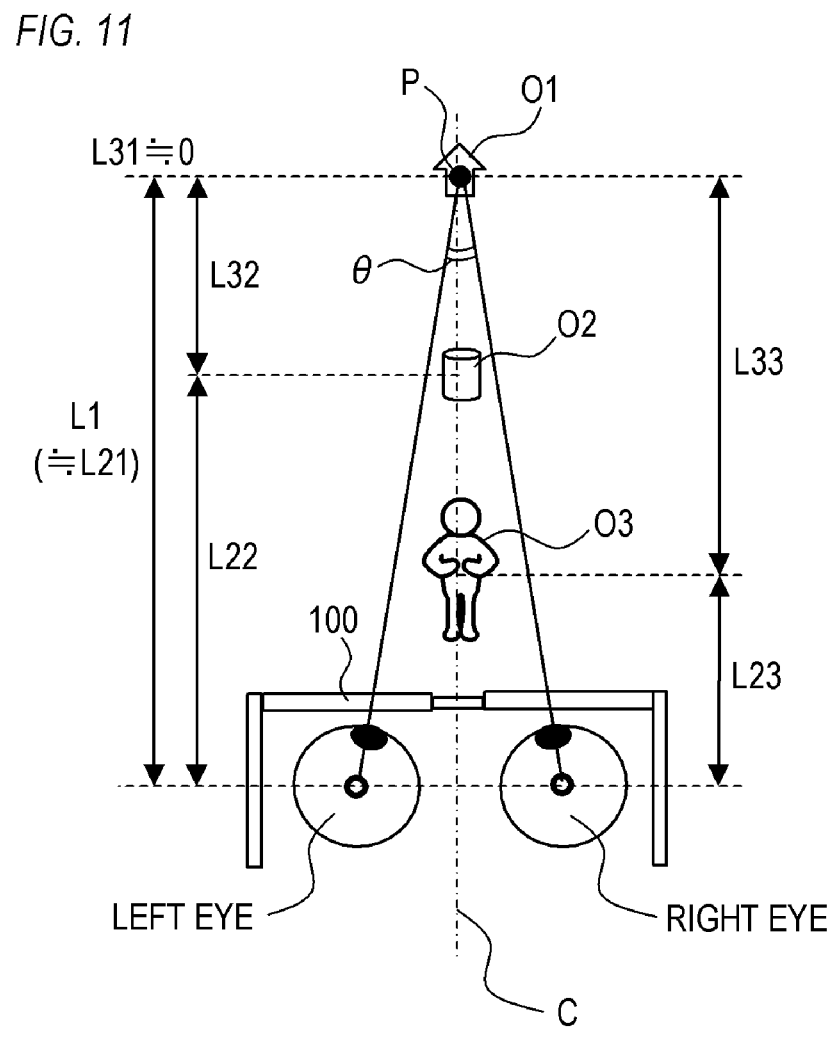

In the example described above, one object exists between the user and the viewpoint P, but a plurality of objects may exist. FIG. 11 indicates this state. In FIG. 11, three objects O1, O2 and O3 exist in the direction from the center of the display device 100 to the viewpoint P. In this case, the CPU 2 may determine a plurality of object distances which correspond to the plurality of objects respectively. Then the CPU 2 may control the setting of the line-of-sight processing based on a plurality of differences between the visual distance and the plurality of object distances.

For example, in step S203, the CPU 2 determines an object distance L21 up to the object O1, an object distance L22 up to the object O2, and an object distance L23 up to the object O3. In step S204, the CPU 2 calculates the degrees of divergence L31, L32 and L33. The degree of divergence L31 is a difference between the visual distance L1 determined in step S202 and the object distance L21 determined in step S203, that is, the difference (L1−L21). The degree of divergence L32 is a difference between the visual distance L1 and the object distance L22, that is, the difference (L1−L22). The degree of divergence L33 is a difference between the visual distance L1 and the object distance L23, that is, the difference (L1−L23). Then the CPU 2 determines whether at least one of the degrees of divergence L31, L32 and L33 is not more than a threshold TH. The CPU 2 advances the processing to step S205 if it is determined that at least one of the degrees of divergence L31, L32 and L33 is not more than the threshold TH, or advances the processing to step S207 if it is determined that all of the degrees of divergence L31, L32 and L33 are more than the threshold TH.

Conclusion

As described above, according to Embodiment 1, the setting of the line-of-sight processing (predetermined processing based on the line-of-sight information) is controlled based on the difference between the visual distance and the object distance. Thereby the line-of-sight processing can be performed appropriately. For example, it can be accurately determined whether or not a user of an optical see-through type display device is gazing at an object, regardless the environment of the surroundings (ambient luminance, quantity of light that enters the eye of the user), and the setting of the line-of-sight processing can be appropriately controlled.

Embodiment 2

Embodiment 2 of the present invention will be described. In the following, description on aspects the same as Embodiment 1 (e.g. configuration and processing the same as Embodiment 1) will be omitted, and aspects different from Embodiment 1 will be described. In Embodiment 1, the CPU 2 sets the line-of-sight processing to enable if it is determined that the degree of gaze is high, and sets the line-of-sight processing to disable if it is determined that the degree of gaze is low. In Embodiment 2, on the other hand, the CPU 2 sets the line-of-sight processing to enable if it is determined that the degree of gaze is low, and sets the line-of-sight processing to disable if it is determined that the degree of gaze is high. The line-of-sight processing is processing to perform display of encouraging gazing, for example.

The user can go out in a state of wearing a head mounted type display device (e.g. optical see-through type AR glasses). User friendliness improves by the display of encouraging gazing at a specific object (object to be viewed). For example, safety of the user is improved by the display of encouraging gazing at an obstacle (e.g. bicycle left on a sidewalk) or gazing at a traffic light.

However, if the user is consciously viewing (gazing at) a specific object, the display of encouraging gazing is a display unintended by the user, and interrupts with the view of the user.

Therefore in Embodiment 2, the CPU 2 performs the display of encouraging gazing if it is determined that the degree of gaze is low, and does not perform the display of encouraging gazing if it is determined that the degree of gaze at a specific object is high. Thereby unnecessary display can be prevented. The conditions to perform the display of encouraging gazing may include a condition in which the viewpoint with both eyes is deviated from a specific object.

The method for detecting a specific object is not especially limited. For example, a camera (imaging apparatus) is mounted on the display device 100 in advance, so as to capture images of the outer world. The CPU 2 detects the specific object in the image captured by the camera using at least one of the various known techniques. To detect the specific object, an arithmetic unit (learned model) can be used, where a captured image is inputted and the detection result is outputted. The CPU 2 may function as the arithmetic unit, or the display device 100 may include a graphics processing unit (GPU) that functions as the arithmetic unit.

As described above, according to Embodiment 2, the line-of-sight processing is set to enable if it is determined that the degree of gaze is low, and the line-of-sight processing is set to disable if it is determined that the degree of gaze is high. The line-of-sight processing can also be performed appropriately by this method. For example, the user can be encouraged to gaze at a specific object, so as not to miss viewing the object.

The above embodiments (including modifications) are merely examples, and the configurations acquired by appropriately modifying or changing the configurations of the above embodiments within the scope of the spirit of the present invention are also included in the present invention. The configurations acquired by appropriately combining the configurations of the above embodiments are also included in the present invention.

According to the present invention, predetermined processing based on the line-of-sight information can be performed appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-126021, filed on Aug. 8, 2022, which is hereby incorporated by reference herein in its entirety.

What is claimed is:

1. An electronic apparatus comprising:

a processor; and a memory storing a program which, when executed by the processor, causes the electronic apparatus to:

execute acquisition processing of acquiring right line-of-sight information on a line-of-sight of a right eye of a user, and left line-of-sight information on a line-of-sight of a left eye of the user;

execute determination processing of determining a first distance, which is a distance from the user to an intersection of the line-of-sight of the right eye and the line-of-sight of the left eye, and a second distance, which is a distance from the user to an object existing between the user and the intersection, on a basis of the right line-of-sight information and the left line-of-sight information; and execute control processing controlling setting of predetermined processing based on the right line-of-sight information and the left line-of-sight information, on a basis of a difference between the first distance and the second distance, wherein in the control processing, the predetermined processing is set to enable in a case where it is determined that a degree of gaze is high on a basis of the difference, and the predetermined processing is set to disable in a case where it is determined that the degree of gaze is low on a basis of the difference, and the predetermined processing includes processing to create a heat map of a line-of-sight position of the user.

2. The electronic apparatus according to claim 1, wherein in the acquisition processing, the right line-of-sight information and the left line-of-sight information of the user wearing an optical see-through type display device on his/her head are acquired.

3. The electronic apparatus according to claim 1, wherein in the determination processing, a convergence angle formed by the line-of-sight of the right eye and the line-of-sight of the left eye is determined on a basis of the right line-of-sight information and the left line-of-sight information, and the first distance is determined in accordance with the convergence angle.

4. The electronic apparatus according to claim 1, wherein the predetermined processing includes processing to display an item at a line-of-sight position of the user.

5. The electronic apparatus according to claim 1, wherein in the control processing, it is determined that the degree of gaze is high in a case where the difference is smaller than a threshold, and it is determined that the degree of gaze is low in a case where the difference is larger than the threshold.

6. The electronic apparatus according to claim 5, wherein in the control processing, a value which is larger as the second distance is longer is used, as the threshold.

7. The electronic apparatus according to claim 1, wherein in the control processing, the degree of gaze is determined on a basis of the difference, it is determined that the degree of gaze is high in a case where the degree of gaze is higher than a threshold, and it is determined that the degree of gaze is low in a case where the degree of gaze is lower than the threshold.

8. The electronic apparatus according to claim 7, wherein in a case where the difference is constant, in the control processing, a value, which is higher as the second distance is longer is determined, as the degree of gaze.

9. The electronic apparatus according to claim 1, wherein in a case where a plurality of objects exist between the user and the intersection, in the determination processing, a plurality of second distances which correspond to the plurality of objects respectively are determined, and in the control processing, setting of the predetermined processing is controlled on a basis of a plurality of differences between the first distance and the plurality of second distances.

10. An electronic apparatus comprising:

a processor; and a memory storing a program which, when executed by the processor, causes the electronic apparatus to:

execute first acquisition processing of acquiring first information on a position in a depth direction of a field-of-view of a user, the first information being based on first line-of-sight information on a line-of-sight of a right eye of the user and second line-of-sight information on a line-of-sight of a left eye of the user;

execute second acquisition processing of acquiring second information on a position in the depth direction of a target which is set based on at least one of the first line-of-sight information and the second line-of-sight information; and execute control processing of controlling predetermined processing based on at least one of the first line-of-sight information and the second line-of-sight information, on a basis of the first information and the second information, wherein in the control processing, the predetermined processing is set to enable in a case where it is determined that a degree of gaze is high on a basis of a difference between the first information and the second information, and the predetermined processing is set to disable in a case where it is determined that the degree of gaze is low on a basis of the difference, and the predetermined processing includes processing to create a heat map of a line-of-sight position of the user.

11. The electronic apparatus according to claim 10, wherein when the program is executed by the processor, the program further causes the electronic device to execute determination processing of determining whether or not the user is gazing at the target on a basis of the first information and the second information.

12. The electronic apparatus according to claim 11, wherein in the determination processing, it is determined whether or not the user is gazing at the target by comparing the difference between the first information and the second information with a threshold, and in the determination processing, the threshold is changed on a basis of the second information.

13. The electronic apparatus according to claim 10, wherein in the control processing, first processing which is the predetermined processing is controlled in a case where the difference between the first information and the second information is smaller than a threshold, and second processing which is different from the first processing is controlled in a case where the difference between the first information and the second information is not smaller than the threshold.

14. The electronic apparatus according to claim 13, wherein in the case where the difference between the first information and the second information is smaller than the threshold, in the control processing, processing to display an item at a position on a display based on at least one of the first line-of-sight information and the second line-of-sight information, and processing to generate the heat map based on at least one of the first line-of-sight information and the second line-of-sight information are performed.

15. The electronic apparatus according to claim 13, wherein in the case where the difference between the first information and the second information is not smaller than the threshold, in the control processing, information, which is not displayed in the case where the difference between the first information and the second information is smaller than the threshold, is displayed on a display.

16. A control method of an electronic apparatus, comprising:

acquiring right line-of-sight information on a line-of-sight of a right eye of a user, and left line-of-sight information on a line-of-sight of a left eye of the user;

determining a first distance, which is a distance from the user to an intersection of the line-of-sight of the right eye and the line-of-sight of the left eye, and a second distance, which is a distance from the user to an object existing between the user and the intersection, on a basis of the right line-of-sight information and the left line-of-sight information; and controlling setting of predetermined processing based on the right line-of-sight information and the left line-of-sight information, on a basis of a difference between the first distance and the second distance, wherein the predetermined processing is set to enable in a case where it is determined that a degree of gaze is high on a basis of the difference, and the predetermined processing is set to disable in a case where it is determined that the degree of gaze is low on a basis of the difference, and the predetermined processing includes processing to create a heat map of a line-of-sight position of the user.

* * * * *